April 30, 1963  G. K. KOCHER  3,087,631
APPARATUS FOR TURNING AN AUTOMOBILE ON ITS SIDE
Filed June 29, 1961  2 Sheets-Sheet 1
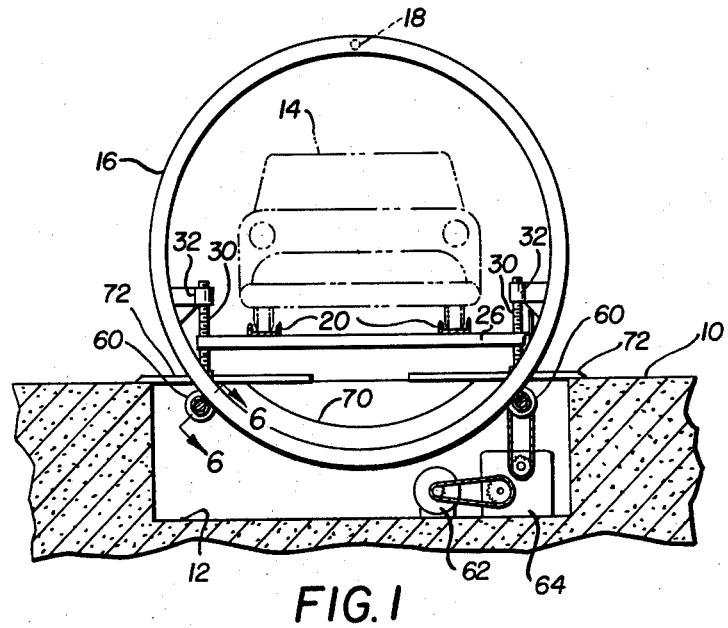
FIG. I
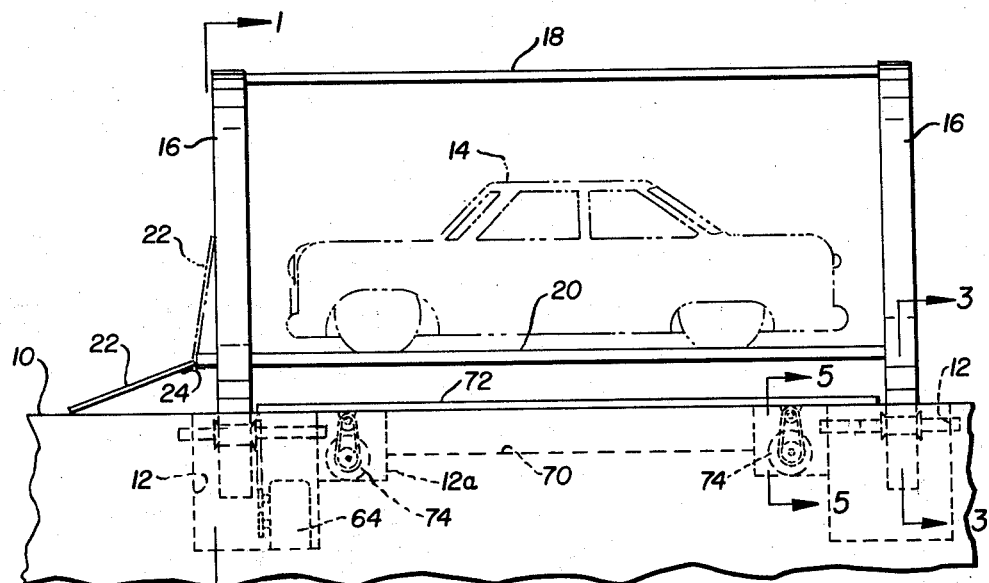
FIG. 2
INVENTOR.
GEORGE K. KOCHER
BY
*Oldham & Oldham*
ATTORNEYS April 30, 1963 G. K. KOCHER 3,087,631
APPARATUS FOR TURNING AN AUTOMOBILE ON ITS SIDE
Filed June 29, 1961 2 Sheets-Sheet 2

INVENTOR.
GEORGE K. KOCHER
BY Oldham & Oldham
ATTORNEYS

United States Patent Office 3,087,631
Patented Apr. 30, 1963

3,087,631
APPARATUS FOR TURNING AN AUTOMOBILE ON ITS SIDE
George K. Kocher, 604 Elmira St., White Haven, Pa.
Filed June 29, 1961, Ser. No. 120,601
4 Claims. (Cl. 214—1)

This invention relates to apparatus upon which an automobile can be driven, locked in place, and then turned on its side, or to some other angle, to facilitate working upon the car, the servicing thereof, or the construction thereof.

It has been the standard practice heretofore in working on an automobile and specifically the underside thereof, for a mechanic to lay flat on his back and hunch his way under the car either with or without a crawler (a platform having casters thereon) to assist him. With cars made lower and lower this operation has become increasingly difficult, and very often a car will be raised up on hydraulic jacks, or otherwise, to facilitate a mechanic getting underneath it.

In any event, the mechanic is still placed in an extremely awkward and dirty position with dirt falling off the car onto him or into his eyes, and with the requirement that he is constantly working above his head which is often tiring and uncomfortable.

Moreover, if the car is raised up on hydraulic jacks it becomes increasingly difficult for the same mechanic, or another mechanic, to work on the top of the car at the same time, and the second mechanic almost has to climb up on a stepladder which leaves him in an awkward position to work on the car.

It is the general object of the present invention to avoid and overcome the foregoing and other difficulties of prior art practices by the provision of a relatively simple, inexpensive, easily operated, and substantially foolproof apparatus onto or into which a car can be driven, locked in place, followed by the bodily movement of the apparatus to turn the car on its side or to some other angle, which will facilitate the servicing, repair, or building of an automobile, or other vehicle, and with the mechanics or workers standing on the floor and working sideways at waist or chest height on the car.

Another object of the invention is the provision of apparatus of the character described wherein relatively simple and positive means are provided for locking the car in the apparatus.

Another object of the invention is to provide apparatus as described wherein an adjustment can be made whereby an automobile is rotated substantially about its center of gravity so that the rotation of the car is facilitated.

Another object of the invention is the provision of the stated apparatus wherein portions of the floor can be moved out of the way to allow the car to be turned on its side, followed by repositioning the floor to limit rotation of the car and provide a safe, smooth, and level floor for the worker.

The foregoing objects of the invention, and other objects which will become apparent as the description proceeds, are achieved by the provision of apparatus to turn an automobile on its side including a pair of endless axially-aligned rings big enough for a car to drive through and spaced apart longitudinally a distance longer than a car, a pair of parallel channels positioned horizontally to form tracks upon which the car can drive, a pair of cross beams securing the channels together at their ends, each cross beam being carried by a ring substantially in chord-like relation thereto, means for adjusting each cross beam to and from the axis of the ring to bring the center of gravity of a car on the channels substantially into alignment with the axis of the ring, means for clamping a car on the channels, roller means for rotatably supporting the rings for movement in the planes thereof and positioning the channels above the level of the floor supporting the apparatus, hinged ramps extending from at least one end of the channels to the floor to allow a car to be driven from the floor onto the channels regardless of the position of adjustment of the cross beams, means for rotating the rings simultaneously in the planes thereof, and flat floor means movable to and from a position underneath the apparatus.

For a better understanding of the invention reference should be had to the accompanying drawings wherein:

FIG. 1 is a transverse vertical sectional view of the apparatus of the invention, taken substantially on line 1—1 of FIG. 2;

FIG. 2 is a side elevation, partially broken away, of the apparatus of the invention;

Figure 3:
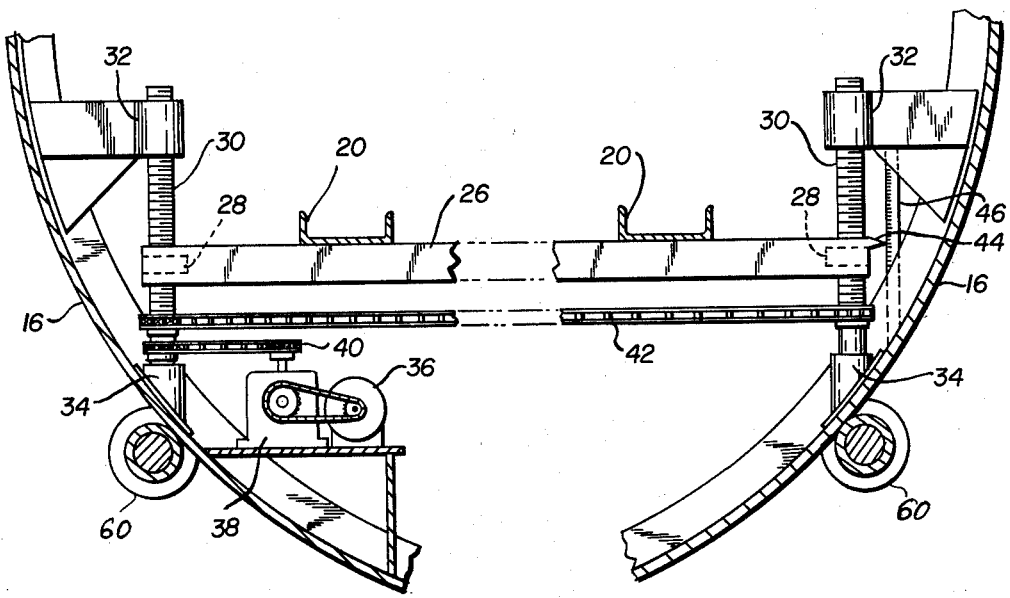
FIG. 3 is an enlarged fragmentary cross-sectional view taken substantially on line 3—3 of FIG. 2 and illustrating the mechanism for substantially aligning the center of gravity of the car with the axis of rotation thereof.

In the drawings, the apparatus of the invention has been illustrated as being installed on the floor of a garage, this being indicated by the numeral 10, with the floor having an appropriate pit 12—12 formed therein at longitudinally spaced points to receive a portion of the apparatus. Although this is the preferred practice of the invention in order that a car 14 can be driven more readily into the apparatus, it is entirely possible that the entire apparatus be positioned above the floor level in which event a car has to be driven up a longer ramp into the apparatus.

The apparatus itself basically comprises a pair of endless metal rings 16 having an inwardly directed channel shape in cross section, these rings being spaced apart longitudinally, as seen in FIG. 2, but being axially aligned. The rings 16 are usually rigidly connected together at their upper peripheries by a beam 18, and the rings 16 serve to support, and are connected together near their bottoms by a pair of parallel positioned longitudinally extending channel beams 20 which serve as a pair of tracks onto which the car 14 is driven. To facilitate this driving of the car 14 onto the channel tracks 20 a ramp 22 is hinged at 24 to the end of each channel track 20 with one end of the ramp 22 running down to the floor 10, and with the ramp being adapted to be swung up and locked in the dotted line position shown in FIG. 2 of the drawing after the car has been driven into the apparatus.

The channel tracks 20 receiving the car 14 are secured together and supported in the plane of each ring 16 by means of a cross beam 26 which is positioned chord-like of each ring 16 in a horizontal position in the manner best seen in FIG. 1. Turning now to FIG. 3, each beam 26 is preferably mounted so as to be adjustable toward and from the axis of the ring 16 so that in this manner the center of gravity of the car 14 can be brought substantially into alignment with the axis of each ring 16 whereby the rotation of the apparatus to turn the car 14 on its side is facilitated. As shown in FIG. 3, a nut 28 is secured in each end of the beam 26 and threaded rods 30 extend through these nuts, with each threaded rod being carried in bearing brackets 32 at the upper ends of the threaded rods 30, and in bearing brackets 34 at the lower ends of the threaded rods. The threaded rods 30 are simultaneously rotated in one direction or the other to move the beam 26 to or from the axis of rotation of each ring 16 by means of a motor 36 driving through a gear reducer 38 and chain and sprocket means 40 and 42. The motor 36, which is reversible, together with the gear reducer 38, the chain and sprocket mechanisms 40—42 and the bearing brackets 32—34 are all mounted on and secured to the inside of the channel-shaped ring 16 as shown in FIG. 3.

In order to show the position of each beam 26 with respect to the axis of rotation of the ring 16 a pointer 44 is secured to the beam. The pointer 44 slides along a scale 46 secured between a bearing bracket 42 and the ring 16 so as to visually indicate the position of each beam 26. The scale 46 can be calibrated to indicate various types and makes of automobiles so that positioning the pointer 44 opposite the line on the scale 46 of a particular make, model, and year car will position the car when on tracks 20 so that the center of gravity of the car is substantially at the axis of rotation of the ring 16.

Figure 4:
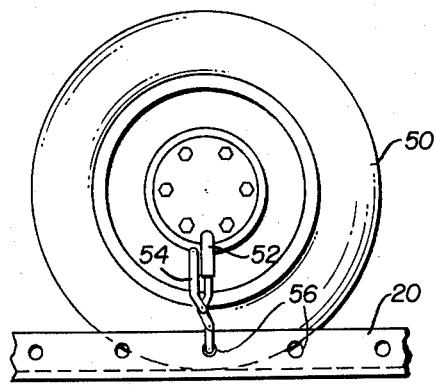
FIG. 4 is an enlarged fragmentary view of the mechanism for locking or clamping the car in the apparatus.
Figure 6:
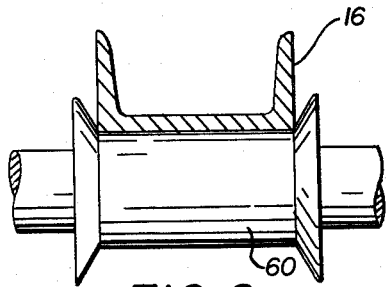
FIG. 6 is an enlarged fragmentary view taken substantially on line 6—6 of FIG. 1 and illustrating a detail of the roller support for the rings of the apparatus.
Figure 5:
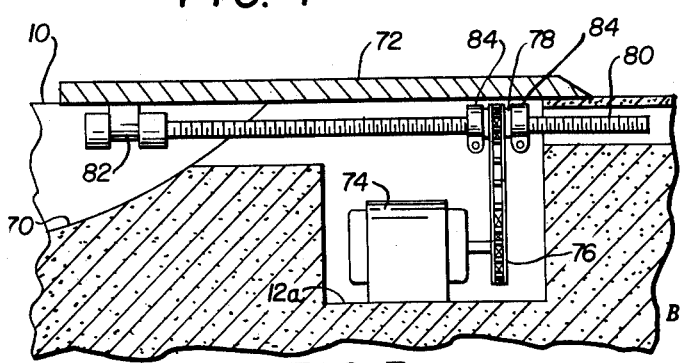
FIG. 5 is an enlarged fragmentary view, taken substantially on line 5—5 of FIG. 2, and illustrating mechanism for positioning a floor surface in conjunction with the apparatus.

FIG. 4 illustrates the manner in which the car 14 is locked on the channel tracks 20. This is accomplished by removing the hub caps from each wheel 50 of the car, hooking a hook 52 of a quick release clamp 54 over the flange of the wheel and down into a selected hole 56 formed in the channel tracks 20 of the apparatus. The quick release clamp 54 may be wrapped around the bottom of the channel tracks 20 rather than in a selected hole 56. It is also possible, as will be recognized, to use quick release clamps, such as 54, to hook the bumpers of a car, both front and rear corners to the channel tracks 20 so that when the car is locked in the apparatus there will be less movement of the springs of the car when the car is turned on its side.

FIG. 1 illustrates that each ring 16 is rotatably supported for rotary movement in its own plane by means of a pair of appropriately journalled relatively heavy rollers 60, and at least one of these rollers 60 engaging each ring 16 is adapted to be rotated by a motor 62 operating through a gear box 64 and appropriate chain drives, this roller rotating mechanism being positioned down in the pit 12 in the manner shown.

When the apparatus is lowered to have parts thereof in the pits 12 so that the level of the channel tracks 20 is only a short distance above the level of the floor 10, the channel tracks 20 may strike the floor 10 when the apparatus is rotated to turn a car on its side. Accordingly, a shallow recess 70 is formed in the upper surface of the floor 10. Forming this recess means that the floor may not be level for a workman to work on the car after it has been turned on its side. Therefore, the invention provides a movably positioned metal plate 72 at one or both sides of the shallow pit 70, the ends of this plate sliding on the surface of the floor 10, and with the pit 12a being provided to receive a motor 74 operating through chain and sprocket means 76 to rotate a nut 78 carried on a screw 80. One end of the screw 80 is held in a bracket 82 secured to the plate 72 so that the screw 80 can turn in relation to the plate 72 but cannot move axially of the screw 80 with respect to the plate. Brackets 84 secured in the pit 12a on opposite sides of the nuts 78 allow the nuts 78 to turn but anchor it axially of the screw. Thus, upon operation of the motor 74 the plate 72 is slid along the surface of the floor 10 to cover or uncover the pit 70. In this manner, the plate 72 can be moved aside to allow the rotary movement of the ring 16, and can thereafter be moved back into position to insure a level floor for an operator to work upon in relation to the car.

It is believed that the structure and operation of the apparatus of the invention will be understood from the foregoing description. Suffice it to note here that by placing portions of the apparatus in the pit, as described, that when the apparatus is operated to turn a car on its side that the level of the car engine is such that a mechanic working to remove the bottom engine pan, for example, is such that the mechanic will be working at chest or waist height. Thus, the mechanic will be in a much more comfortable and workable position then he would be lying under the car and working upward. In like manner, operations upon other portions of the car are facilitated, for example, operations upon the transmission, the differential, the drive shaft, and even the wheel. Also, it will be noted that operations upon the top of the engine can likewise be readily performed, with the mechanic in a far more natural and workable position than when attempting to climb on top of the car when it is in normal horizontal position. One mechanic can be working on the top of the engine and simultaneously a second mechanic can be working underneath the engine.

The fact that the apparatus provides for the adjustment of the center of gravity of the car to substantially the center of rotation of the rings 16 greatly reduces the amount of power required in the motor 62, and normally makes it unnecessary for a motor 62 to be used in association with each ring 16, although this can be done if desired.

In the preferred practice of the invention a pair of motors 74 with associated driving mechanism for sliding the floor plate 72 is employed in conjunction with each floor plate 72, a motor 74 being provided at each end of the plate 72 in the manner described. Usually a pair of floor plates 72 are utilized in the apparatus, as best seen in FIG. 1, the plate 72 moving in from each side of the apparatus in a manner which will be understood.

It should be understood that although the invention has been primarily illustrated and described as usable in repairing, greasing and other servicing operations on cars, and other vehicles, that the apparatus is useful, as well, in production operations upon vehicles. For example, in production uses the strengthening brace 18 may be moved to provide such a brace on both sides of the rings 16 to leave the top clear so a car body can be directly lowered onto a new vehicle frame and bolted temporarily in place. Thereafter, the whole vehicle can be rotated about the horizontal axis to position the vehicle so that the body can be more readily welded to the frame. Other production uses or advantages will suggest themselves to the vehicle manufacturer.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus to turn an automobile on its side including a pair of endless axially-aligned rings big enough for a car to drive through and spaced apart longitudinally a distance longer than a car, a pair of parallel channels positioned horizontally to form tracks upon which the car can drive, a pair of cross beams securing the channels together at their ends, each cross beam being carried by a ring substantially in chord-like relation thereto, means for adjusting each cross beam to and from the axis of the ring to bring the center of gravity of a car on the channels substantially into alignment with the axis of the ring, means for clamping a car on the channels, roller means for rotatably supporting the rings for movement in the planes thereof and positioning the channels above the level of the floor supporting the apparatus, hinged ramps extending from at least one end of the channels to the floor to allow a car to be driven from the floor onto the channels regardless of the position of adjustment of the cross beams, means for rotating the rings simultaneously in the planes thereof, and flat floor means movable to and from a position underneath the apparatus, said floor means having a portion thereof intersecting the arc formed by the channels whereby the circumferential movement of the car is limited.

2. Apparatus to turn an automobile on its side including a pair of endless axially-aligned rings big enough for a car to drive through and spaced apart longitudinally a distance longer than a car, a pair of parallel channels positioned horizontally to form tracks upon which the car can drive, a pair of cross beams securing the channels together at their ends, each cross beam being carried by a ring substantially in chord-like relation thereto, means for clamping a car on the channels, roller means for rotatably supporting the rings for movement in the planes thereof and positioning the channels near the level of the floor supporting the apparatus, means for rotating the rings simultaneously in the planes thereof, and floor means movable to and from a position underneath the apparatus intersecting the arc formed by the channels whereby the circumferential movement of the car is limited.

3. Apparatus to turn over a vehicle including track means onto which the vehicle can be driven, means for rotatably supporting the track means for rotation about a horizontal axis, means for releasably clamping the vehicle on the track means, means for adjusting the track means toward and from the horizontal axis of the rotatable supporting means so as to bring the center of gravity of the vehicle substantially into alignment with the horizontal axis, movable floor plates, and means for moving the plates out of the way to facilitate the rotary movement of the vehicle about the horizontal axis and for moving the plates back under the vehicle to facilitate operations thereon after the vehicle has been tilted to a desired working position and to limit rotation of the tilted vehicle.

4. Apparatus to turn over a vehicle including track means onto which the vehicle can be driven, means for rotatably supporting the track means for rotation about a horizontal axis, means for releasably clamping the vehicle on the track means, movable floor plates, and means for moving the plates out of the way to facilitate the rotary movement of the vehicle about the horizontal axis and for moving the plates back under the vehicle to facilitate operations thereon after the vehicle has been tilted to a desired working position and to limit circumferential movement of the tilted vehicle.

References Cited in the file of this patent

UNITED STATES PATENTS

| 1,367,073 | Morrison | Feb. 1, 1921 |
| 1,444,704 | Petteys | Feb. 6, 1923 |
| 2,015,357 | Weaver | Sept. 24, 1935 |
| 2,680,420 | Sheffer | June 8, 1954 |

FOREIGN PATENTS

| 495,592 | Germany | Apr. 12, 1930 |
| 528,226 | Germany | June 26, 1931 |